US011952201B2

(12) United States Patent
Gabriel

(10) Patent No.: US 11,952,201 B2
(45) Date of Patent: Apr. 9, 2024

(54) GRAVITY-ORIENTED ONE-WAY VALVE CONTAINER APPARATUS AND METHOD

(71) Applicant: Gameel Gabriel, Covington, LA (US)

(72) Inventor: Gameel Gabriel, Covington, LA (US)

( * ) Notice: Subject to any disclaimer, the term of this patent is extended or adjusted under 35 U.S.C. 154(b) by 1260 days.

(21) Appl. No.: 15/960,454

(22) Filed: Apr. 23, 2018

(65) Prior Publication Data

US 2019/0168950 A1 Jun. 6, 2019

Related U.S. Application Data

(63) Continuation-in-part of application No. 15/831,443, filed on Dec. 5, 2017.

(51) Int. Cl.

| | |
|---|---|
| ***B65D 83/00*** | (2006.01) |
| ***B65D 8/00*** | (2006.01) |
| ***B65D 23/02*** | (2006.01) |
| ***B65D 81/24*** | (2006.01) |
| ***B67D 3/00*** | (2006.01) |

(52) U.S. Cl.

CPC .......... *B65D 83/0055* (2013.01); *B65D 11/04* (2013.01); *B65D 23/02* (2013.01); *B65D 81/24* (2013.01); *B67D 3/0051* (2013.01); *B67D 3/0067* (2013.01); *B67D 3/007* (2013.01)

(58) Field of Classification Search

CPC ............ B65D 83/0055; B65D 83/0088; B65D 11/04; B67D 3/0051

USPC .............................................................. 215/6

See application file for complete search history.

(56) References Cited

U.S. PATENT DOCUMENTS

| | | | | |
|---|---|---|---|---|
| 4,892,230 | A * | 1/1990 | Lynn, Jr. | B65D 23/02 215/12.1 |
| 5,344,045 | A * | 9/1994 | Richter | B65D 1/0215 215/12.2 |
| 5,433,346 | A * | 7/1995 | Howe | B65D 77/06 222/481.5 |
| 8,453,860 | B2 | 6/2013 | Otero | |
| 8,561,853 | B2 | 10/2013 | De Mei | |
| 9,199,785 | B2 | 12/2015 | Kneer | |
| 9,211,994 | B2 * | 12/2015 | Andersen | B65D 83/226 |
| 9,238,527 | B2 * | 1/2016 | Kakuta | B65D 47/0838 |
| 9,556,012 | B2 | 1/2017 | Leys et al. | |
| 2010/0230438 | A1 | 9/2010 | Sardo, Jr. | |
| 2013/0008921 | A1 * | 1/2013 | Poggio | B65D 21/08 222/152 |
| 2014/0061234 | A1 * | 3/2014 | Eldreth | B05B 11/0059 222/105 |
| 2014/0252037 | A1 * | 9/2014 | Poggio | B65D 11/04 222/152 |
| 2015/0284163 | A1 | 10/2015 | Manwani et al. | |
| 2019/0077555 | A1 * | 3/2019 | Paisley | B65D 47/30 |
| 2019/0315548 | A1 * | 10/2019 | Bazoberry | B65D 81/2084 |

* cited by examiner

*Primary Examiner* — Anthony D Stashick
*Assistant Examiner* — Raven Collins
(74) *Attorney, Agent, or Firm* — Kenneth L. Tolar

(57) ABSTRACT

A gravity-oriented one-way valve container apparatus and method for separation of air from fluids providing an internal bladder, a one-way valve, and air vents allowing automatic opening of the container upon tilting and automatic closing of the container upon return to an upright position, thereby preventing the entry of contaminating air.

8 Claims, 8 Drawing Sheets

GRAVITY-ORIENTED ONE-WAY VALVE CONTAINER APPARATUS AND METHOD

CROSS-REFERENCE TO RELATED APPLICATIONS

This application is a continuation-in-part of my co-pending application Ser. No. 15/831,443 filed on Dec. 5, 2017, the full disclosure of which is incorporated by reference herein and priority of which is hereby claimed.

BACKGROUND

This invention provides a gravity-oriented one-way valve container apparatus and method for separation of air from fluids.

When a sealed container, such as a bottle of beverage fluid like soda, wine, or milk, is opened and part of the fluid removed from the bottle, ambient air flows into the container. This ambient air fills the void left by the removed fluid and equalizes the pressure inside and outside of the container.

In most cases, entry of such air into a partially-filled container will introduce contaminants featured in the air, such as microorganisms that in turn have an opportunity to multiply and spoil the beverage during storage. In some cases, such as when air enters a baby bottle of milk or formula, the entry of air would be especially unwanted because the baby might ingest the air and the contaminants contained within the air.

Some beverages contained in a bottle may be carbonated. More specifically, carbonation of beverages such as soft drinks, soda pop, beer, sparking wine and wine coolers, and the like is the incorporation of carbon dioxide ($CO_2$) gas into water of the liquid beverage, which technically produces carbonic acid, an extremely weak acid. Carbonation produces a fizz, and greatly improves the taste, mouth feel, and palatability of the beverage. Because yeasts, when fermenting a beverage, generate carbon dioxide, carbonation can be produced naturally during production of some beverages. However, in most cases, carbon dioxide is injected into the beverage via tanks of carbon dioxide under pressure, ultimately achieving the high level of carbonation desired by the beverage manufacturer. Accordingly, carbonated beverages are sent out from their production facilities under elevated pressure of carbon dioxide, in well-sealed containers like bottles and cans. When the sealed container is opened, the carbon dioxide incorporated into the beverage starts to escape as gas bubbles, and that escape process continues until the beverage goes completely "flat" (i.e., has no more carbon dioxide present in the beverage), if the beverage is not consumed prior to the carbon dioxide disappearing.

If the carbonated beverage is shipped in, or is later poured into, a resealable container, then there will no longer be an increased pressure of carbon dioxide in the air-filled spaces of the container after the initial opening of the container. Those spaces are filled with plain air at normal pressure. Under those conditions, carbon dioxide incorporated into the beverage will escape into the air space, making the beverage flatten or become less carbonated.

There is therefore a need for a beverage container that prevents the entry of air and preserves the carbonation of a beverage over time, and throughout repeated opening and closing of the container.

Several inventors have developed various bladder-containing beverage bottles for dispensation of a certain liquid.

However, most of these prior art devices are geared towards efficient dispensation of the liquid, by utilizing a bladder in a way that provides for the liquid to be guided out through the beverage container upon continuous dispensation of the liquid. Prior art does not provide a solution geared to preserving the carbonation of the beverages.

For example, U.S. Publication No. 2010/0230438, published by Vincent Sardo, Jr. on Sep. 16, 2010, discloses a "Dispensing Bottle." The Sardo concept provides for a plastic bottle fitted with a one-way check valve and an inner bladder containing a substance such as mustard or ketchup. When squeezed, the substance is dispensed from an inner bladder through an aperture in the top. When released, air is allowed into the bottle through the valve to displace the substance dispensed. Since the valve will not allow air out of the bottle, the bladder continuously shrinks, until all the substance is dispensed, without any waste or the need to either strike the bottle or to store it upside down. No air comes into contact with the substance, thus avoiding bacterial contamination.

U.S. Publication No. 2015/0284163 was published by assignee Kuvee, Inc. on Oct. 8, 2015, disclosing a "Container for Preserving Liquid Contents." The beverage container, created by inventors Vijay Girdhar Manwani et al., includes a flexible inside container and a rigid outside container. The flexible container can retain a liquid and seal the liquid from environmental air, while the surrounding rigid container facilitates handling and pouring in a form factor that reproduces the look and feel of a conventional wine bottle. A one-way valve permits pouring from the flexible container while preventing ingress of atmospheric oxygen or other contaminants. In particular, the one-way valve can be configured to retain a beverage within the flexible container until an exit path for the beverage through the valve is filled with liquid to seal the exit path and effectively eliminate any return path for ingress of air. To create a bottle-like pouring experience, the valve may automatically open to allow for the pouring of fluid when the bottle is tilted, and the valve may automatically close at the end of a pour.

U.S. Pat. No. 9,238,527, issued on Jan. 19, 2016 to Yoshiyuki Kakuta et al., covers a "Dispensing Container." The dispensing container provides that after discharging content, the content that has not been returned to an internal container is prevented from leaking out of a discharge port. The dispensing container includes (a) a container body with a flexible internal container to contain content, and that deforms so as to deflate with a decreasing amount of the content, and an external container in which the internal container is attached, where the external container is provided with a suction port for sucking external air in between the internal container and the external container; (b) a discharge cap that is attached to a spout of the container body, and is provided with a discharge port for discharging the content; (c) an external-air inlet port that communicates between the outside and the suction port; and (d) an air valve that switches between a communicated state and a shutoff state of communication between the external-air inlet port and the suction port. The dispensing container is further designed such that the discharge cap includes an inside plug member that closes the spout, and a cylindrical body member with a top-closed cylindrical shape, with the cylindrical body member covering the inside plug member and featuring the discharge port. The inside plug member is also provided with a communication port, which communicates between the discharge port and the internal container. Lastly, a valve body is arranged and fitted in the communication port so as to be slidable along an axial direction of the communication port, with the valve body being elastically displaced along the axial direction so as to open and close the communication port.

U.S. Pat. No. 8,453,860 was issued to Efrain Otero on Jun. 4, 2013 for a "Bottle with Ratcheting Base and Inner Bladder." The bottle was designed to remove the excess air in an opened, partially used bottle containing effervescent beverages. Further use of the bottle can be employed when viscous substances are contained. These purposes are achieved by rotating a base of a bottle that is connected to a tab at the bottom of an inner bladder liner, which is in turn contained inside a bottle. The bottle system is used for dispensing and maintaining effervescent beverages fresher for a longer period of time after a bottle has been opened. The bottle also improves the dispensing of thick substances found in many products that have viscous properties. The system offers a more efficient solution for dispensing of such substances from their containers by employing a collapsible inner bladder liner contained inside a bottle.

U.S. Publication No. 2014/0061234 was published by David C. Eldreth on Mar. 6, 2014, and discloses a "Serving and Preserving System." The system provides for embodiments of a container system for ingestion by humans, and a method of storing and dispensing liquids for ingestion that include at least one first structure in the general shape of a bottle. The system further includes at least one partially flexible container, positioned at least partially in an inner space, and at least one liquid passageway and one air purger that is capable of purging air out of the partially flexible container through at least one opening. The system also provides at least one ball check valve and at least one manually initiated valve, and additionally features embodiments of an air pump purging system and a method for an air pump purging system for the liquid container system. The flexible container within the system is typically made of or lined in a material similar to plastic, rubber, or silicone, such that the liquid contained therein can be inserted into and/or stored in the flexible container. The interior may also be made with or lined with a food-grade material. When gravity causes liquid to flow out of the otherwise sealed flexible container that is not in an airtight container, a vacuum can be created in the flexible container that will enable the flexible container to compress inward. The flexible container featured in the Eldreth publication will be sufficiently flexible so that if the container contains a liquid and the flexible container is not surrounded by an airtight outer container, the flexible container will be able to collapse on itself rather than maintaining the space originally occupied by the liquid when the flexible container is partially inverted, such that the liquid will flow out of the flexible container appropriately.

U.S. Pat. No. 8,561,853, issued on Oct. 22, 2013 to Mauro De Mei, covers an "Airtight Preservation System." The Mei patent discloses an airtight preservation system of a consumer fluid within a container, and particularly a system for preservation of the fluid, where the fluid would typically be intended for alimentary consumption, from contamination by contact with outside atmosphere. The system was designed to be easily installed, by virtue of a compact structure applicable to any container size. The device of the system is preferably of substantially cylindrical shape, internally connected with a case. The case is made integral to the container by a removable fitting substantially at an inlet thereof. The system further includes a plug, connected with the device, and having a delivery spout and a through hole, as well as a compensation casing with an inlet mouth, connected to the system by a connecting manifold internal to the case. Inside the compensation casing, a substitute fluid is present. The substitute fluid would preferably be gaseous, and would typically be air coming from an outside environment into the container. The system arranges, at a variation of the internal volume of the container taken up by the consumer fluid concomitantly to a delivery of the fluid, a proportional flow of substitute fluid into the compensation casing in order to compensate for the internal volume variation, and to keep the overall pressure internally of the container at a substantially constant predetermined value.

U.S. Pat. No. 9,199,785 was issued to assignee Gaplast GmbH on Dec. 1, 2015, covering a "Container Having an Inner Bag." The container, created by inventor Roland Kneer, is produced in a coextrusion-type blow molding process. The container consists of a substantially rigid outer container and an easily deformable inner bag, with the inner bag being closed by a bottom weld seam when excess material is squeezed off at the bottom of a blow mold. The bottom weld seam is clamped in a likewise closed bottom weld seam of the outer container. The container further provides for at least one pressure compensating opening, formed on both sides of the bottom weld seam, and where all pressure compensating openings are formed at points of the outer container that are offset in the circumferential direction from the intersection lines of a plane extending through the bottom weld seam and through the longitudinal center axis of the container with the circumferential wall of the outer container and of the inner bag. In this manner, the inner bag contracts only from two sides when the container contents are dispensed. The wall thickness of the inner bag is greater in the area of the intersection lines than in the interposed circumferential portions.

Lastly, U.S. Pat. No. 9,556,012 was issued to inventors John A. Leys et al. on Jan. 31, 2017 for a "Pressurized System for Dispensing Fluids." The system provides for a bag-in-bag-in-bottle assembly formed by a flexible dispensing container with a dispensing fitment. The dispensing container is positioned adjacent, or sandwiched between, one or more flexible pressurization containers having a separate inlet/outlet path through a second fitment. The bag-in-bag assembly can then be placed in a containment vessel with the fitments mounted such that it is accessible on the vessel. A liquid can be extracted from the dispensing container by introducing a fluid into the pressurization containers with enough pressure to force the liquid out through the dispensing fitment. A contoured dispensing head may be coupled to the bag-in-bag-in-bottle assembly using a cam actuation arrangement for simultaneously locking the pressurization, vent, and fluid extraction couplings. In operation of the device, the inner flexible container is completed filled with fluid, and the outer flexible container has been emptied by the pressure exerted against it by the inner flexible container as it was filled and its outer surface pressed against the inner surface of the containment vessel that houses the bag-in-bag assembly. Then a portion of the fluid contained in the inner flexible container is dispensed, due to the pressure created by the introduction of a gas into the outer flexible container. As more gas is introduced into the outer flexible container, the inner flexible container is uniformly compressed. That uniform compression can result in nearly total dispensation of the fluid contained in the inner flexible container.

There accordingly remains a need for a beverage container system and method that preserves carbonation, over time and throughout repeated opening and closing of the beverage container, and further prevents the entry of contaminating air into the beverage container.

SUMMARY OF THE INVENTION

This invention provides a gravity-oriented one-way valve container apparatus and method for separation of air from fluids, comprising an internal bladder, a one-way valve, and air vents that allow for automatic opening of the container upon tilting and automatic closing of the container upon return to an upright position, thereby preventing the entry of contaminating air.

BRIEF DESCRIPTION OF DRAWINGS

Reference will now be made to the drawings, wherein like parts are designated by like numerals, and wherein.

DETAILED DESCRIPTION OF THE INVENTION

Figure 1:
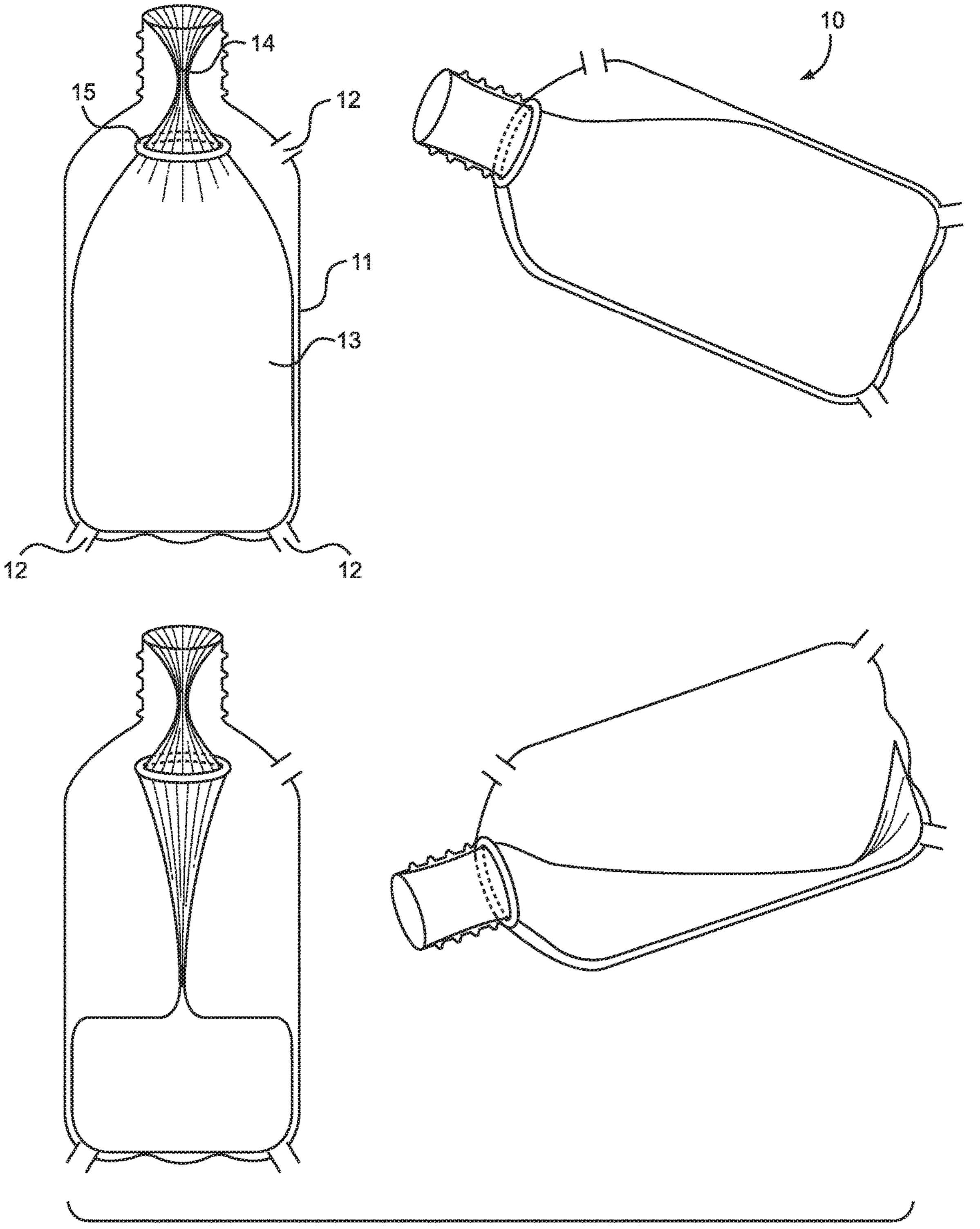
FIG. 1 is a view of a first embodiment of the gravity-oriented one-way valve container of the invention.

Referring to FIG. 1, a first embodiment 10 of the gravity-oriented one-way valve container is shown. Inside a container body 11 having at least one ventilation hole 12 is a bladder 13. The neck of the bladder, near the mouth of the container body 11, is an elastic neck nozzle 14 made of elastic material. A rigid ring 15 is attached at the bottom of the neck, where it meets the bladder 13. When the container is in an upright position, the elastic neck nozzle 14 is in a contracted state, sealing the container. When the container is tilted, the weight of the fluid contained in the bladder 13 pushes the elastic neck nozzle 14 open, and the fluid comes out. When the container is returned to an upright position, the elastic neck nozzle 14 contracts again, and the container is sealed.

Figure 2:
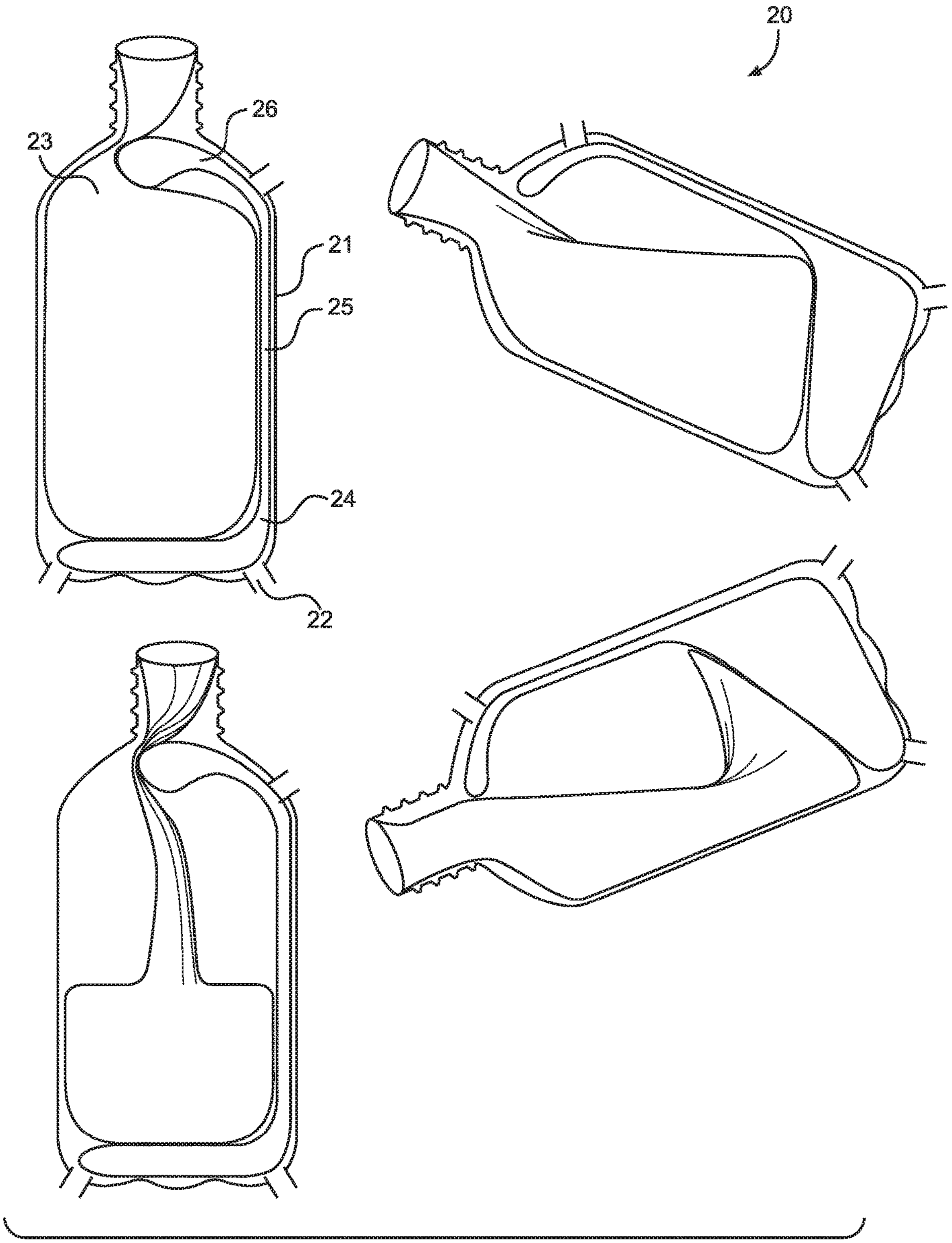
FIG. 2 is a view of a second embodiment of the gravity-oriented one-way valve container of the invention.

Referring to FIG. 2, a second embodiment 20 of the gravity-oriented one-way valve container is shown. Inside a rigid container body 21 having at least one ventilation hole 22 is a bladder 23. At the bottom of the bladder 23 containing the liquid, there is an air pouch 24 filled with air and attached to the bottom of the liquid bladder at its top and to the rigid outer container at its bottom and is connected with an air track 25 along the side of the rigid container all the way to the neck of the container where it connects to an elastic balloon 26. When the container is vertical it displaces the air by the weight of the liquid from the air pouch 24, through the air track 25, and into the elastic balloon 26, which expands against the neck of the bladder 23 to seal the container. When the container is tilted, the liquid moves away from the bottom of the container towards the neck, the elastic balloon 26 will deflate as air moves back into the air pouch 24 through the air track 25, resulting in the opening of the container.

Figure 3:
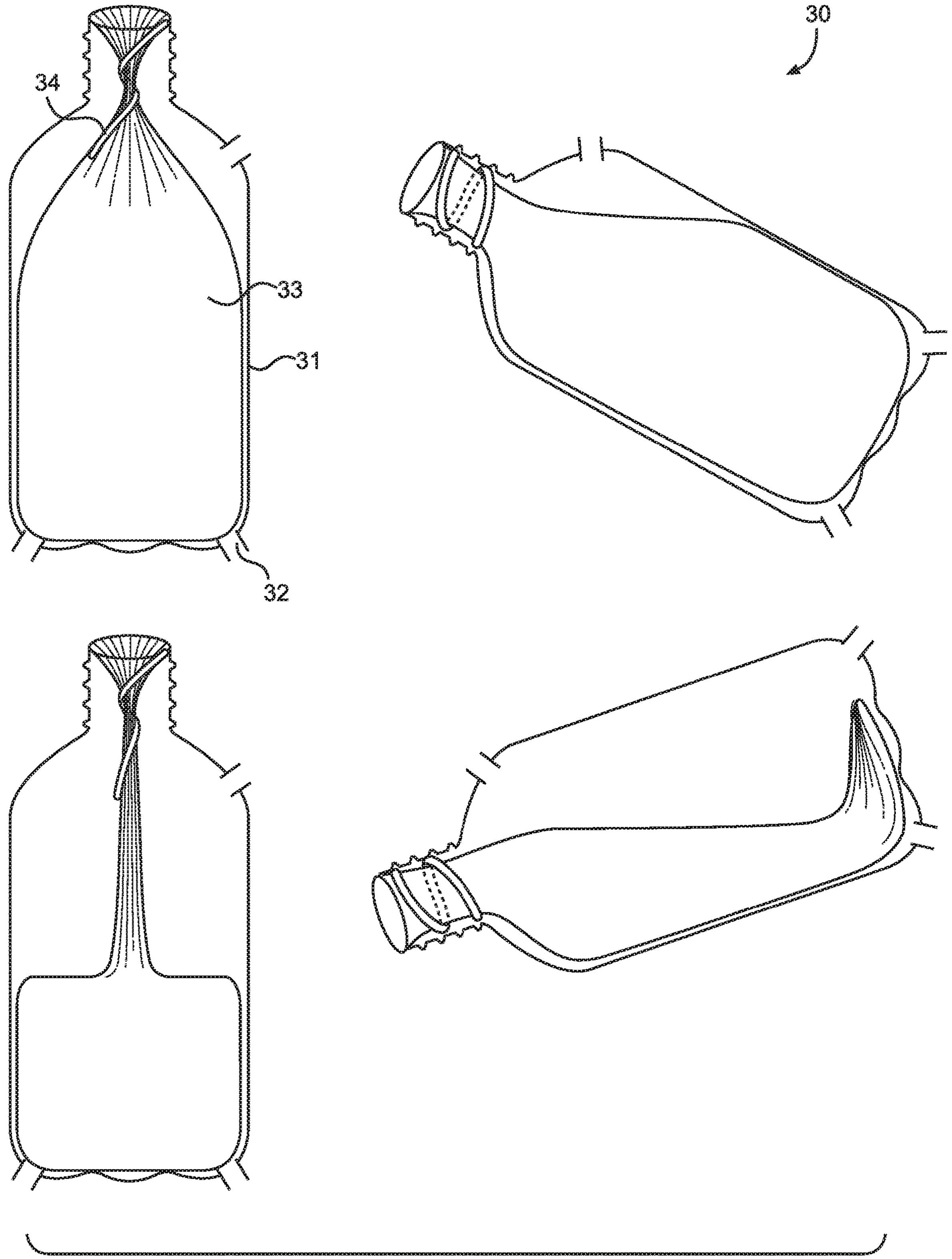
FIG. 3 is a view of a third embodiment of the gravity-oriented one-way valve container of the invention.

Referring to FIG. 3, a third embodiment 30 of the gravity-oriented one-way valve container is shown. Inside a container body 31 having at least one ventilation hole 32 is a bladder 33. The neck of the bladder, near the mouth of the container body 31, is gathered into an elastic neck nozzle surrounded by a helical coil 34 made of metal or plastic, which can be displaced into a larger circumference under pressure but will return to a smaller circumference in the absence of pressure. Also, the weight of the liquid pulls the bladder down and stretches the elastic neck nozzle, further placing it into a closed state. When the container is in an upright position there is no fluid pressure at the elastic neck nozzle, which is held closed by the closed helical coil 34, sealing the container. When the container is tilted, the weight of the fluid contained in the bladder 33 overcomes and displaces the helical coil 34, pushing the elastic neck nozzle open, and the fluid comes out. When the container is returned to an upright position, the helical coil 34 contracts around the elastic neck nozzle again, and the container is sealed.

Figure 4:
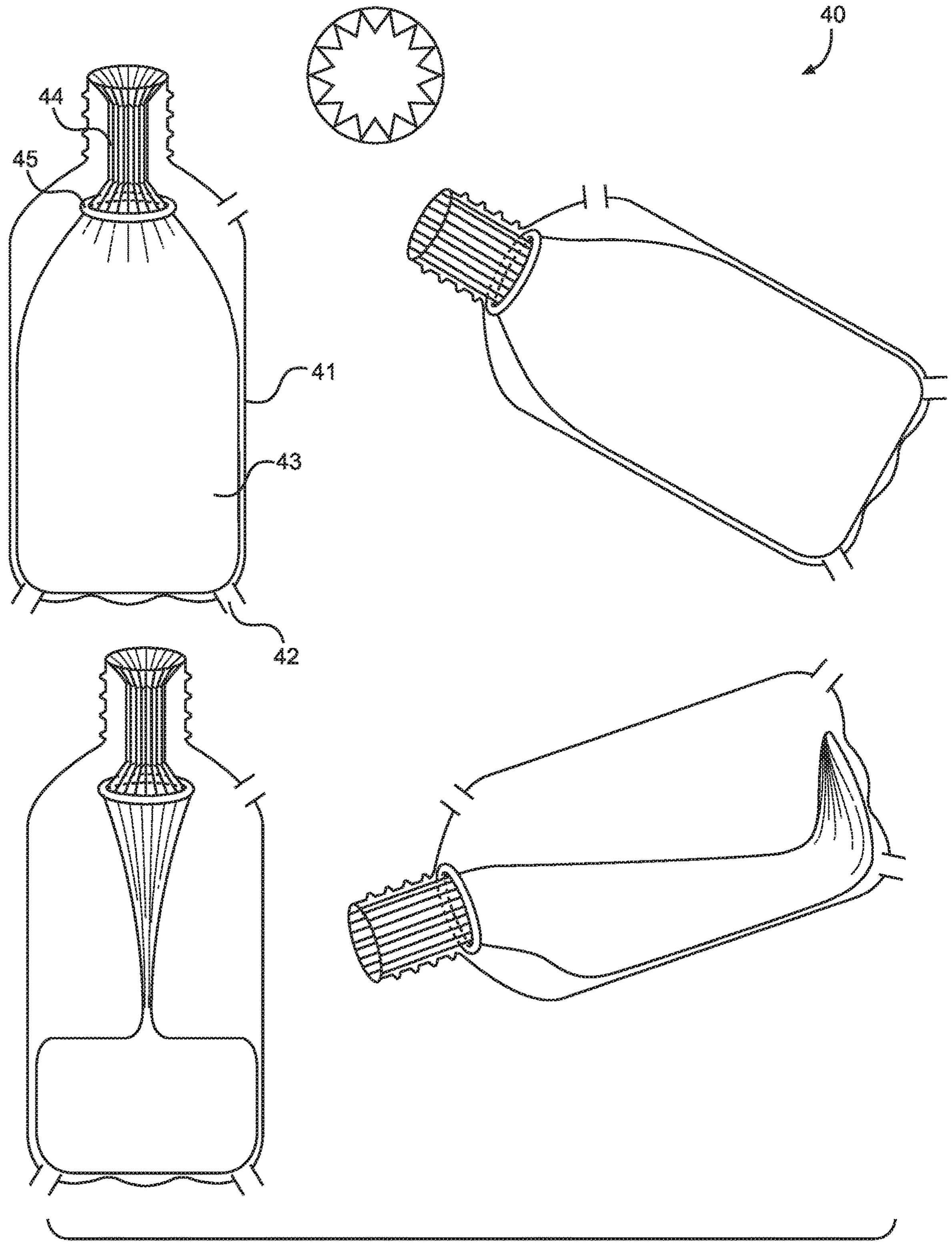
FIG. 4 is a view of a fourth embodiment of the gravity-oriented one-way valve container of the invention.

Referring to FIG. 4, a fourth embodiment 40 of the gravity-oriented one-way valve container is shown. Inside a container body 41 having at least one ventilation hole 42 is a bladder 43. The neck of the bladder, near the mouth of the container body 41, is an accordioned neck nozzle 44. A rigid ring 45 is attached at the bottom of the neck, where it meets the bladder 43. When the container is in an upright position, the weight of the liquid in the bladder 43 pulls on the accordioned neck nozzle 44, which closes and seals the container. When the container is tilted, the accordioned neck nozzle 44 is relieved of the weight of the fluid, and the accordioned neck nozzle 44 opens, and the fluid comes out.

Figure 5:
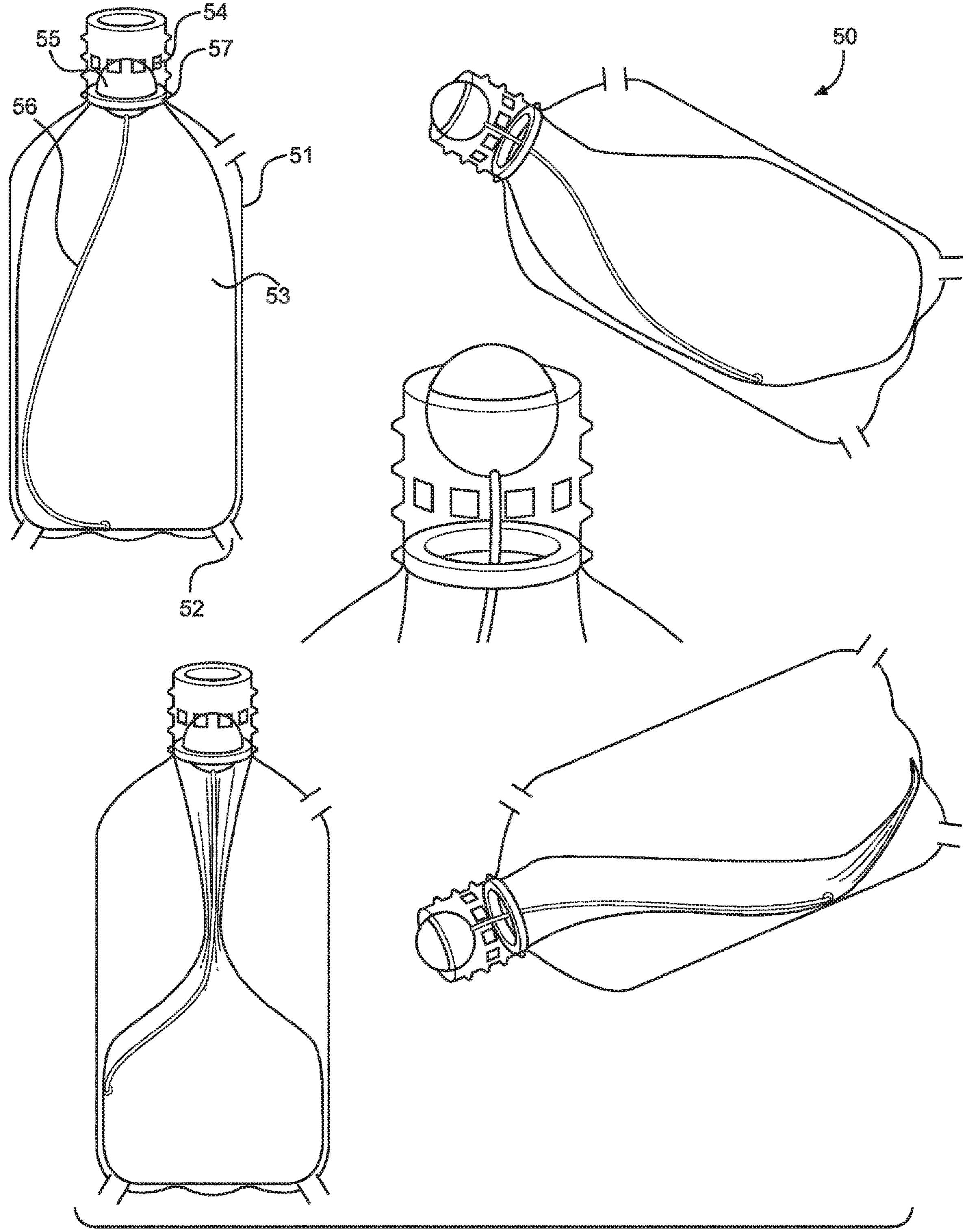
FIG. 5 is a view of a fifth embodiment of the gravity-oriented one-way valve container of the invention.

Referring to FIG. 5, a fifth embodiment 50 of the gravity-oriented one-way valve container is shown. Inside a rigid container body 51 having at least one ventilation hole 52 is a soft bladder 53. The neck of the rigid container body has holes 54 all along the circumference to let the liquid out when tilted. A ball 55 is attached with a thread 56 to the bottom of the soft bladder 53. When the rigid container body 51 is vertical, the thread 56 will pull the ball 55 down against a neck seat 57, sealing the neck of the bottle. When tilted, the liquid will push the ball 55 towards the other end and liquid will flow through the holes 54.

Figure 6:
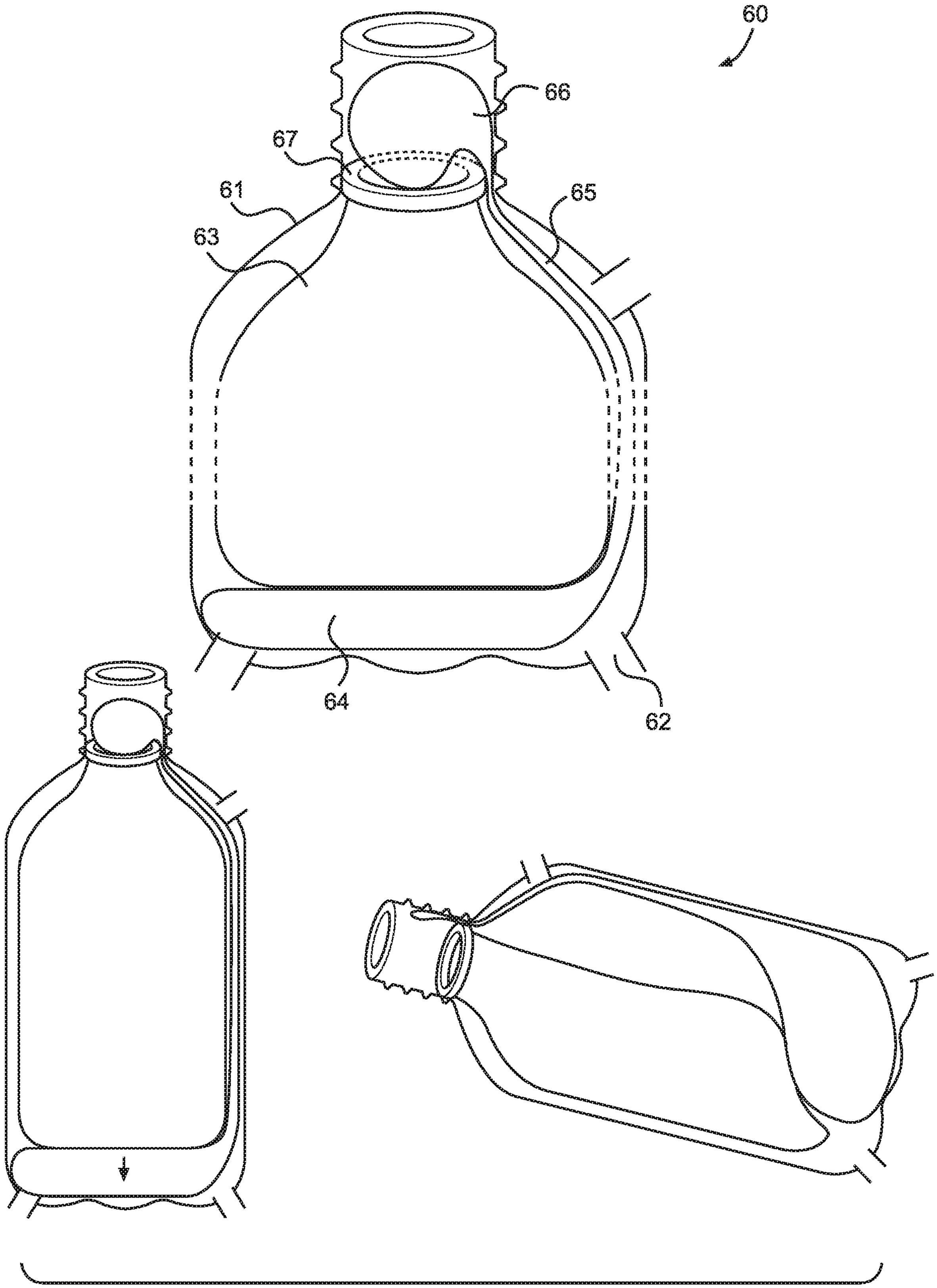
FIG. 6 is a view of a sixth embodiment of the gravity-oriented one-way valve container of the invention.

Referring to FIG. 6, a sixth embodiment 60 of the gravity-oriented one-way valve container is shown. Inside a container body 61 having at least one ventilation hole 62 is a bladder 63. At the bottom of the bladder 63 containing the liquid, there is an air pouch 64 filled with air and attached to the bottom of the liquid bladder at its top and to the outer container at its bottom and is connected with an air track 65 along the side of the rigid container all the way to the neck of the container where it connects to an elastic balloon 66. When the container is vertical it displaces the air by the weight of the liquid from the air pouch 64, through the air track 65, and into the elastic balloon 66, which expands against a neck seat 67 to seal the container. When the container is tilted, the liquid moves away from the bottom of the container towards the neck, the elastic balloon 66 will deflate as air moves back into the air pouch 64 through the air track 65, resulting in the opening of the container.

Figure 7:
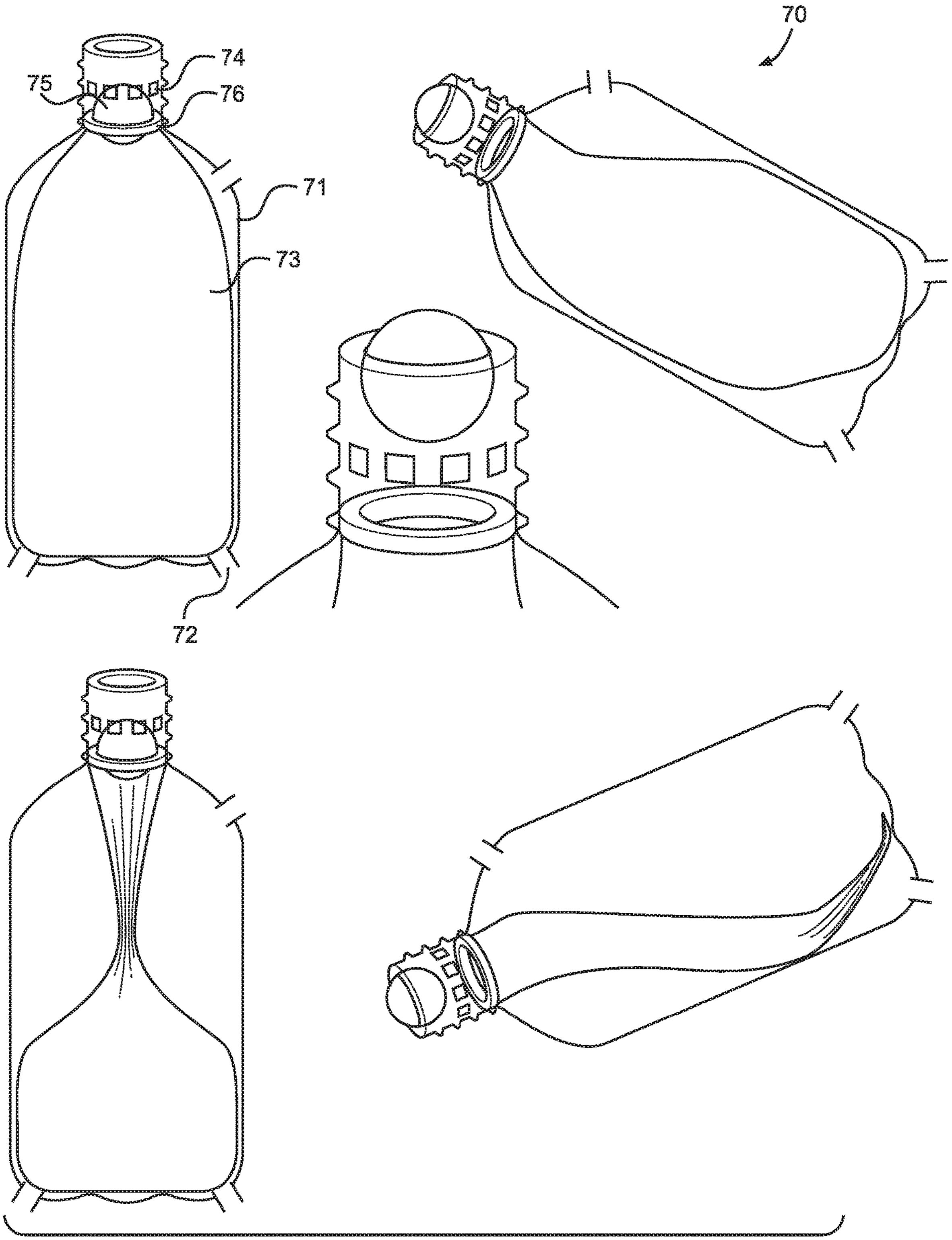
FIG. 7 is a view of a seventh embodiment of the gravity-oriented one-way valve container of the invention.

Referring to FIG. 7, a seventh embodiment 70 of the gravity-oriented one-way valve container is shown. Inside a rigid container body 71 having at least one ventilation hole 72 is a soft bladder 73. The neck of the rigid container body has holes 74 all along the circumference to let the liquid out when tilted. A ball 75 is movably mounted inside the neck, above a neck seat 57. When the rigid container body 51 is vertical, the weight of the ball 55 will press down against the neck seat 56, sealing the neck of the bottle. When tilted, the liquid and gravity will push the ball 55 towards the other end and liquid will flow through the holes 54.

Figure 8:
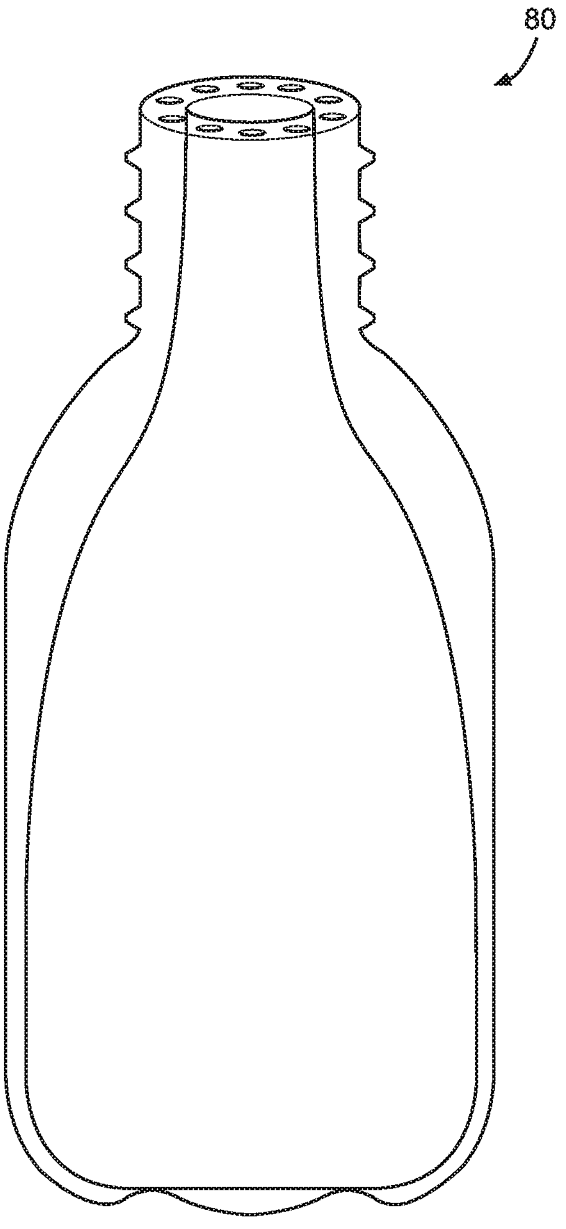
FIG. 8 is a view of an eighth embodiment of the gravity-oriented one-way valve container of the invention.

Referring to FIG. 8, an eighth embodiment 80 of the gravity-oriented one-way valve container is shown. The container body has multiple ventilation holes at the top of the neck.

Many other changes and modifications can be made in the apparatus and method of the present invention without departing from the spirit thereof. I therefore pray that my rights to the present invention be limited only by the scope of the appended claims.

I claim:

1. A gravity-oriented one-way valve container apparatus for automatically opening and closing a container with no intrusion of air, the gravity-oriented one-way valve container comprising:

(i) a container body;

(ii) at least one ventilation hole in said container body, adapted to allow rapid equilibration of air pressure within said container body;

(iii) a bladder mounted inside said container body, adapted to contain contents and exclude air;

(iv) a valve adapted to automatically seal said bladder when said container body is in a vertical orientation and to automatically unseal said bladder when said container body is in a tilted orientation;

(v) holes in the upper neck of said container body to disperse liquid;

(vi) a neck seat mounted in the lower neck of said container; and, (vii) a ball movably encompassed by the neck of said container body, above said neck seat.

2. The gravity-oriented one-way valve container apparatus of claim 1, further comprising a thread mounted to said ball at one end and to the bottom of said bladder at the other end.

3. The gravity-oriented one-way valve container apparatus of claim 1, further adapted for use with a bottle-type beverage container.

4. The gravity-oriented one-way valve container apparatus of claim 1, further comprising multiple ventilation holes at the top of the neck of said container body.

5. A gravity-oriented one-way valve container method for automatically opening and closing a container of contents with no intrusion of air, comprising:

(i) providing a gravity-oriented one-way valve container apparatus, comprising:

(a) a container body;

(b) at least one ventilation hole in said container body, adapted to allow rapid equilibration of air pressure within said container body;

(c) a bladder mounted inside said container body, adapted to contain contents and exclude air;

(d) a valve adapted to automatically seal said bladder when said container body is in a vertical orientation and to automatically unseal said bladder when said container body is in a tilted orientation;

(e) holes in the upper neck of said container body;

(f) a neck seat mounted in the lower neck of said container; and (g) a ball movably encompassed by the neck of said container body, above said neck seat.

(ii) using said gravity-oriented one-way valve container apparatus, where, in use, when said container body is in a vertical orientation it is sealed, and when said container body is in a tilted orientation it is unsealed.

6. The gravity-oriented one-way valve container method of claim 5, where said gravity-oriented one-way valve container further comprises a thread mounted to said ball at one end and to the bottom of said bladder at the other end.

7. The gravity-oriented one-way valve container method of claim 5, where said gravity-oriented one-way valve container further comprises multiple ventilation holes at the top of the neck of said container body.

8. The gravity-oriented one-way valve container method of claim 5, where said gravity-oriented one-way valve container is further adapted for use with a bottle-type beverage container.

* * * * *